US008817642B2

(12) United States Patent
Donaldson (10) Patent No.: US 8,817,642 B2
(45) Date of Patent: Aug. 26, 2014

(54) EFFICIENT PAIRING OF NETWORKED DEVICES

(75) Inventor: Thomas A. Donaldson, San Francisco, CA (US)

(73) Assignee: AliphCom, San Francisco, CA (US)

( * ) Notice: Subject to any disclaimer, the term of this patent is extended or adjusted under 35 U.S.C. 154(b) by 387 days.

(21) Appl. No.: 13/117,539

(22) Filed: May 27, 2011

(65) Prior Publication Data

US 2011/0320535 A1 Dec. 29, 2011

Related U.S. Application Data

(60) Provisional application No. 61/358,610, filed on Jun. 25, 2010.

(51) Int. Cl.
*H04L 12/28* (2006.01)
*H04J 1/16* (2006.01)

(52) U.S. Cl.
USPC ............................ 370/252; 370/330; 370/389

(58) Field of Classification Search
USPC .......................... 370/252, 230, 329, 389, 330
See application file for complete search history.

(56) References Cited

U.S. PATENT DOCUMENTS

| 2002/0082835 | A1 | 6/2002 | Squibbs |
| 2005/0257260 | A1 | 11/2005 | Lenoir et al. |
| 2008/0016537 | A1 | 1/2008 | Little et al. |
| 2008/0102793 | A1 | 5/2008 | Ananthanarayanan et al. |
| 2010/0246824 | A1* | 9/2010 | Xiao et al. ..................... 380/270 |
| 2011/0314153 | A1* | 12/2011 | Bathiche et al. .............. 709/225 |

OTHER PUBLICATIONS

International Search Report and Written Opinion mailed Oct. 27, 2011 in PCT Application No. PCT/US11/41747 filed Jun. 24, 2011.

* cited by examiner

*Primary Examiner* — John Pezzlo
(74) *Attorney, Agent, or Firm* — Kokka & Backus, PC (57) ABSTRACT

A system, apparatus, and method for enabling a communication device to be paired with multiple other communication devices that are connected to a network without the need to conduct a separate pairing operation between the first communication device and each of the other network-connected devices. The data exchanged between a user's communication device and a peer communication device (e.g., one of a group of network-connected communication devices) that is used to authenticate communications between the user device and the peer device (i.e., link key) is stored in a network-accessible data storage and retrieval system. The link key is used by the user device when attempting to establish communications with a different peer device (e.g., another one of the network-connected devices) and is retrieved by the other network-connected peer device and used to enable authenticated communications between the other peer device and the user device.

20 Claims, 7 Drawing Sheets

EFFICIENT PAIRING OF NETWORKED DEVICES

CROSS-REFERENCE TO RELATED APPLICATION

This application claims priority from and the benefit of provisional application No. 61/358,610, filed on Jun. 25, 2010, the full disclosure of which is incorporated herein by reference for all purposes.

BACKGROUND

Embodiments of the invention are directed to systems, apparatuses, and methods for operating communications devices, and specifically, to a method and associated system and apparatus for enabling and/or conducting a pairing operation between a device capable of implementing a Bluetooth or other standardized communication protocol and one or more peer devices that are connected by a network.

In order for a device capable of communicating using the Bluetooth communications protocol to communicate with a second Bluetooth capable device, an operation or process that is termed "pairing" must be performed. Pairing typically involves the detection of one device by the other, followed by the exchange of data (e.g., a password or other authentication data), verification of the exchanged data, and if verified, the establishment of a communications channel or connection between the devices. Typically, a Bluetooth device must be paired at least once with each peer device with which it interoperates before any user communications can occur between the two devices. For example, a Bluetooth headset must normally be paired at least once with each Bluetooth cell phone or desk-phone with which it is to be used. However, this standard pairing process has a number of drawbacks: it typically requires user intervention (and thus limits the range of tasks that can be performed without user participation); the pairing mode of operation is typically less secure than other operating modes and so may present a security risk; the pairing operation may prevent the device from being used for its primary purpose (such as communications or data transmission) for a period of time; and, it may be difficult for the user to understand how to perform the pairing necessary to get their devices to work together properly.

In addition, a particular problem may occur when a user wishes to use one Bluetooth device with a family (i.e., a set, group, or network of suitable devices) of peer devices (where, typically, peer devices may be somewhat interchangeable among themselves as far as delivery of the overall service). For example, a user with a Bluetooth headset may wish to use their headset with multiple enterprise telephones that are connected to the same enterprise network (where the user may not be overly concerned with which particular telephone they are connected, or which specific services each telephone provides). In a traditional pairing model, the user would need to conduct a pairing operation with each enterprise phone that they might wish to use in the future (where this potentially might be hundreds of phones). Such a set of multiple pairing operations are not only time-consuming for the user, but typically may exhaust the data storage capacity of a typical headset (which, as part of the pairing operations, typically stores the information necessary to retain a record of each successful pairing operation). Another example where a similar problem may exist is when a user wishes to use their Bluetooth device with a number of devices within their home: for example, one or more personal computers, a Bluetooth-enabled music system, or a Bluetooth-enabled home telephone. Yet another similar case is when a user may access a web-based service via multiple access-devices. For example, many users use web-based voice-over-IP telephony services (such as Skype) from multiple devices (such as their home computer, a work computer, or a mobile telephone). At present, if they wish to use a Bluetooth headset with all of the devices they use with Skype, they must conduct a separate pairing operation with each such device.

As a result of the aforementioned problems, what is desired is a process, method, apparatus, and/or system which enables a user to reduce the number of pairing operations required when using a Bluetooth device with a family, group, set, or network of Bluetooth peer devices. This would permit a Bluetooth device to be paired with multiple network connected devices without the need to perform multiple pairing operations. Embodiments of the invention address these problems and other problems individually and collectively, and overcome the noted disadvantages of requiring multiple pairing operations.

SUMMARY

Embodiments of the invention are directed to a system, apparatus, and method for enabling a first communication device to be paired with multiple other communication devices that are connected to a network without the need to conduct a separate pairing operation between the first communication device and each of the other network-connected devices. In some embodiments, the data exchanged between a user's communication device and a peer communication device (e.g., one of a group of network-connected communication devices) that is used to authenticate communications between the user device and the peer device (typically termed a "link key", and which is generated as part of a previous pairing operation) is stored in a network-accessible data storage and retrieval system. The link key is used by the user device when attempting to establish communications with a different peer communication device (e.g., another one of the group of network-connected devices) and is retrieved by the other network-connected peer device and used to enable authenticated communications between the other peer device and the user device. In this way the user device is enabled to communicate and exchange data in a secure manner with peer devices that are part of a network-connected set of devices without participating in a separate pairing operation with each of the network-connected devices. This is accomplished, in part, by "sharing" the authentication data for one of the network-connected devices with other of those devices by using a commonly accessible data storage and retrieval system.

In one embodiment, the invention is directed to a method of enabling a user device to communicate with a family of peer devices, where the method includes the user device detecting a peer device advertising itself as belonging to a family of peer devices, determining whether a pairing has previously been made with any of the peer devices in the family of peer devices, in response to determining that a pairing has not previously been made performing a pairing operation with the peer device to create a link key, and generating a record associating the link key with the family of peer devices.

In another embodiment, the invention is directed to a method for establishing communications between a user device and a peer device, the method comprising the user device detecting a peer device advertising itself as belonging to a family of peer devices; determining whether a pairing has previously been made with the peer device or any other peer device in the family of peer devices; if a pairing has previously been made, establishing a connection with the peer device using a previously stored link key; and if a pairing has not previously been made, performing a pairing operation with the peer device to create a link key and generating a record associating the link key with the family of peer devices.

In yet another embodiment, the invention is directed to a method for establishing communications between a peer device and a user device, the method comprising a peer device advertising itself as belonging to a family of peer devices; receiving a connection attempt from a user device; determining whether a pairing has previously been made with the user device by the peer device or any other peer device in the family of peer devices; if a pairing has previously been made, establishing a connection with the user device using a previously stored link key; and if a pairing has not previously been made, performing a pairing operation with the user device to create a link key and generating a record associating the link key with the user device.

Other objects and advantages of the invention will be apparent to one of ordinary skill in the art upon review of the detailed description of the invention and the included figures.

DETAILED DESCRIPTION

Embodiments of the invention are directed to a system, apparatus, and method for enabling a first communication device to be paired with multiple other communication devices that are connected to a network without the need to conduct a separate pairing operation between the first communication device and each of the other network-connected devices. In some embodiments, the data exchanged between a user's communication device and a peer communication device (e.g., one of a group of network-connected communication devices) that is used to authenticate communications between the user device and the peer device (typically termed a "link key", and which is generated as part of a previous pairing operation) is stored in a network-accessible data storage and retrieval system. The link key is used by the user device when attempting to establish communications with a different peer communication device (e.g., another one of the group of network-connected devices) and is retrieved by the other network-connected peer device and used to enable authenticated communications between the other peer device and the user device. In this way the user device is enabled to communicate and exchange data in a secure manner with peer devices that are part of a network-connected set of devices without participating in a separate pairing operation with each of the network-connected devices. This is accomplished, in part, by "sharing" the authentication data for one of the network-connected devices with other of those devices by using a commonly accessible data storage and retrieval system.

In some embodiments, the invention operates to enable a user to effectively pair a device with any of a set of network-connected peer devices, rather than requiring that a pairing operation be conducted with each of the peer devices individually. In some embodiments, the invention may include: (a) a Bluetooth-enabled user device which includes, in addition to such elements operational to perform ordinary Bluetooth interoperation and pairing, a local data storage capable of retaining additional information used for network pairing operations; and (b) a communications network which includes (1) a set of network-connected peer devices capable of communicating using a Bluetooth protocol; and (2) a data storage and retrieval system accessible by the peer devices connected to the communications network (where the data storage and retrieval system may be part of the peer devices or may be provided as a separate networked element). An example embodiment of the invention will now be described with reference to the included figures.

Figure 1:
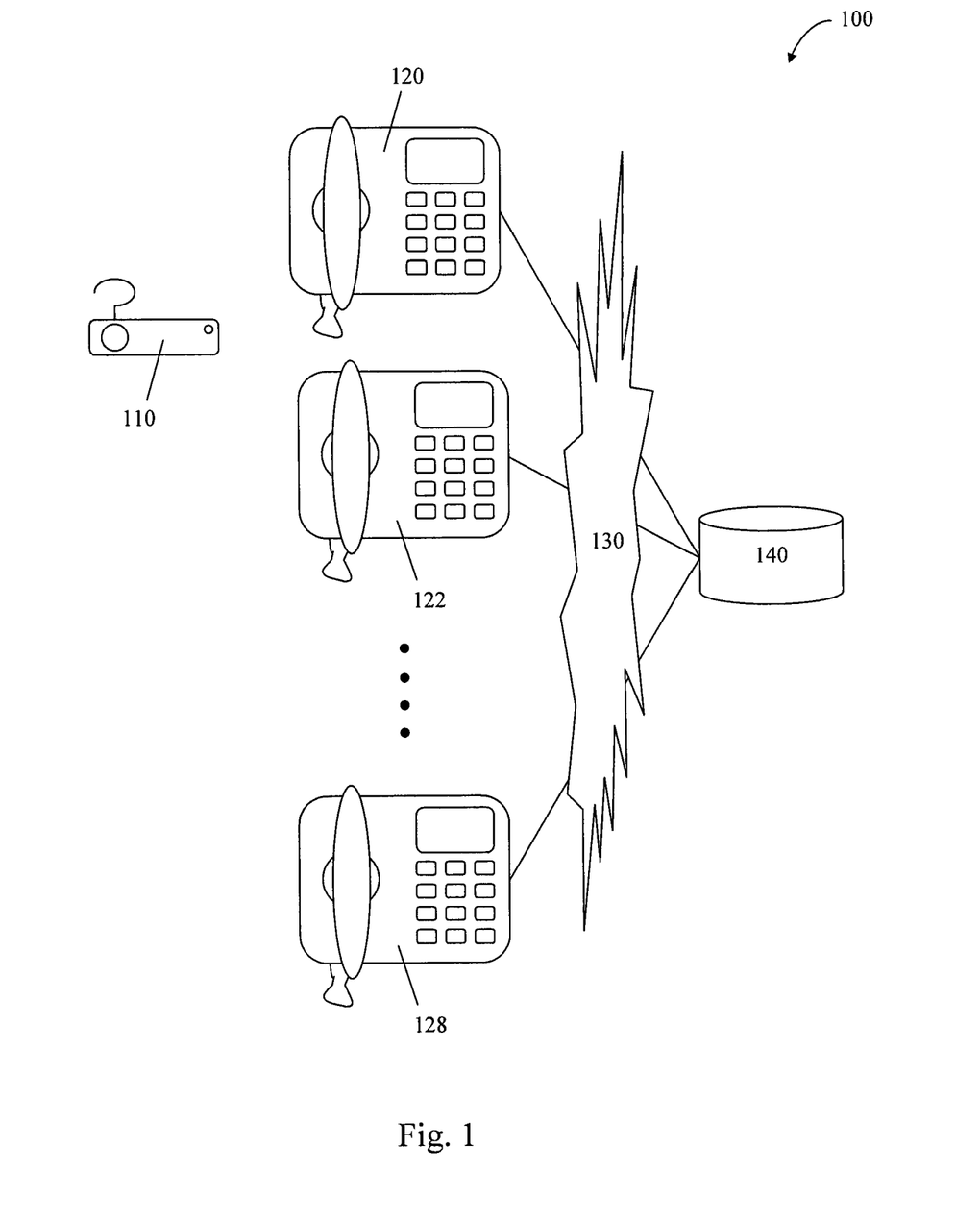
FIG. 1 is a block diagram illustrating a communication system 100 that may be used in implementing an embodiment of the invention.

FIG. 1 is a block diagram illustrating a communication system 100 that may be used in implementing an embodiment of the invention. Communication system 100 includes a Bluetooth-enabled personal user device 110, a family (i.e., a set, group, or network) of Bluetooth-enabled peer devices 120-128, a communications network 130, and a data storage and retrieval system 140. It should be noted that although communication system 100 is described with reference to a Bluetooth-enabled personal user device and Bluetooth-enabled peer devices, in some embodiments of the invention the personal user device and peer devices need not be Bluetooth-enabled. Rather, they may communicate with one another using other wireless or wired communication methods or protocols. For example, they may communicate with one another using Zigbee or Bluetooth Low Energy.

Communication system 100 may be used by a user of user device 110 to communicate with one or more of family of peer devices 120-128 which are connected to each other by communications network 130. Peer devices 120-128 are, in this embodiment, interconnected via communications network 130 to data storage and retrieval system 140.

According to this embodiment, user device 110 may be a Bluetooth headset. However, different types of user device 110 may be used, with such devices including, but not limited to, personal computers, cell phones and other wireless phones, network access points, etc. Similarly, according to this embodiment, peer devices 120-128 may be Bluetooth-enabled desk telephones. However, different types of peer devices 120-128 may be used, with such devices including, but not limited to, personal computers, cell phones and other wireless phones, network access points, etc. Further, in this embodiment, communications network 130 may be an Ethernet network. However, a variety of interconnection elements or structures may be used between peer devices 120-128, including, but not limited to, Token Ring, TCP/IP, or wireless connections using Wifi or other suitable systems. Further, in this embodiment, data storage and retrieval system 140 may be a network database server which is accessed by a network database request/response element via the HTTP protocol. However, data storage and retrieval system 140 may also be provided in other forms and implemented in other architectures; for example, a client-server architecture using a database server or a web-server or a file-server; a computer server running an operating system and a SQL server, such as MySQL or SQL Server; a peer-to-peer system architecture using an appropriate broadcast query (using, for example, the DHCP or DNS protocols); or one of a family of personal computers, where a single Bluetooth device is used for the family. In some embodiments, the separate data storage and retrieval system 140 may be optional. As described below, data discussed as being stored in data storage and retrieval system 140 could alternatively be stored in a local data storage element, cache, memory, etc. provided in one or more of peer devices 120-128.

Figure 2:
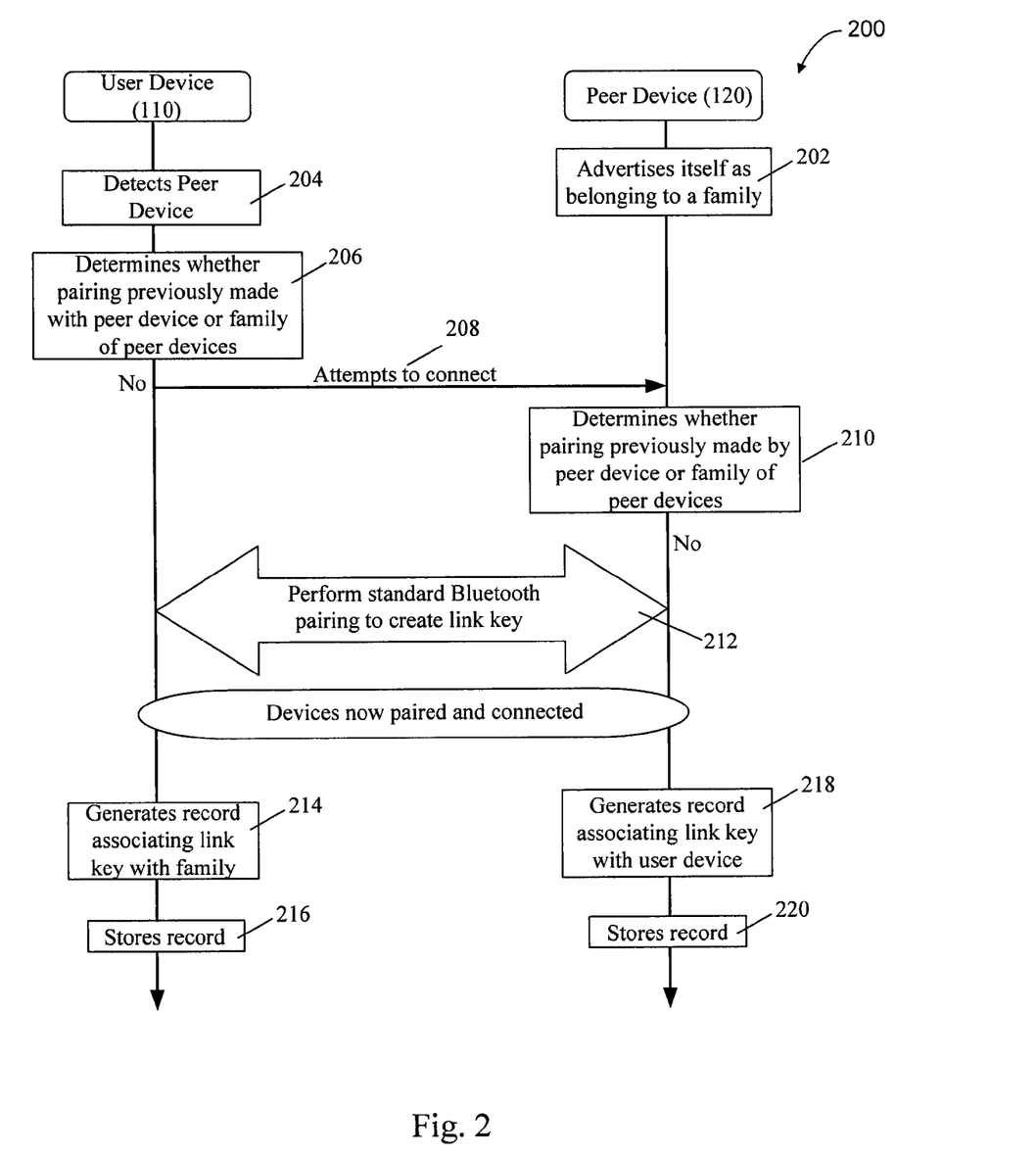
FIG. 2 is a flowchart 200 illustrating a sequence of events for enabling user device 110 to communicate with family of peer devices 120-128 in accordance with an embodiment of the invention.

FIG. 2 is a flowchart 200 illustrating a sequence of events for enabling user device 110 to communicate with family of peer devices 120-128 in accordance with an embodiment of the invention. Specifically, FIG. 2 illustrates how user device 110 can establish communications with one of peer devices 120-128 through a pairing operation, and then process the results of that pairing operation to enable user device 110 to establish communications with another one or more of peer devices in family of peer devices 120-128.

In step or stage 202, peer device 120 advertises itself as being available for communication. For example, it might remain in or regularly enter the Discoverable state (as defined by the Bluetooth specifications), and present Service Discovery Protocol (SDP) records that indicate the services it provides (where these may be defined for various Bluetooth profiles, such as the Hands-Free Profile, in the Bluetooth specifications). Additionally, peer device 120 presents additional information that indicates that it is part of a given family (i.e., a set, group, or network) of peer devices. For example, it may present an additional SDP record containing a custom Universally Unique Identifier (UUID) that is presented by all members of the family, but not by peer devices that are not members of the family. Peer device 120 might alternatively or additionally present such a custom UUID in its Extended Inquiry Response (EIR) record, as defined in the Bluetooth specifications. The presentation of additional family-specific information enables a user device to immediately determine whether or not a peer device is a member of a family of peer devices and effectively perform subsequent processing for creating Bluetooth connections as further described below. The provision of such information also enables a peer device to immediately determine whether it is a member of a family of peer devices and effectively perform subsequent processing for creating Bluetooth connections as further described below.

In step or stage 204, user device 110 attempts to detect a suitable peer device with which to connect. This may be accomplished by performing a Bluetooth inquiry process as defined in the Bluetooth specification. Here, user device 110 detects peer device 120. At this point, user device 110 also determines whether peer device 120 is part of a family of peer devices. To do so, user device 110 may use a Bluetooth address of peer device 120, any SDP records, EIR data, or another suitable source of data presented to it by peer device 120. For example, if user device 110 receives a UUID from peer device 120, then user device 110 may read the contents of the UUID to identify the family of peer devices 120-128 which peer device 120 is a member of. For another example, if user device 110 receives a Bluetooth address of peer device 120, user device 110 may search its local data storage, memory, cache, etc. for an indication that the Bluetooth address (and thus peer device 120) is associated with a particular family of peer devices.

In step or stage 206, user device 110 determines whether it has previously paired with peer device 120 or the family of peer devices 120-128 to which peer device 120 belongs. User device 110 may make such a determination through appropriate analysis of the Bluetooth address, SDP records, EIR data, or other suitable source of data presented to it by peer device 120. According to one embodiment of the invention, such a determination is further described with reference to FIG. 3.

Figure 3:
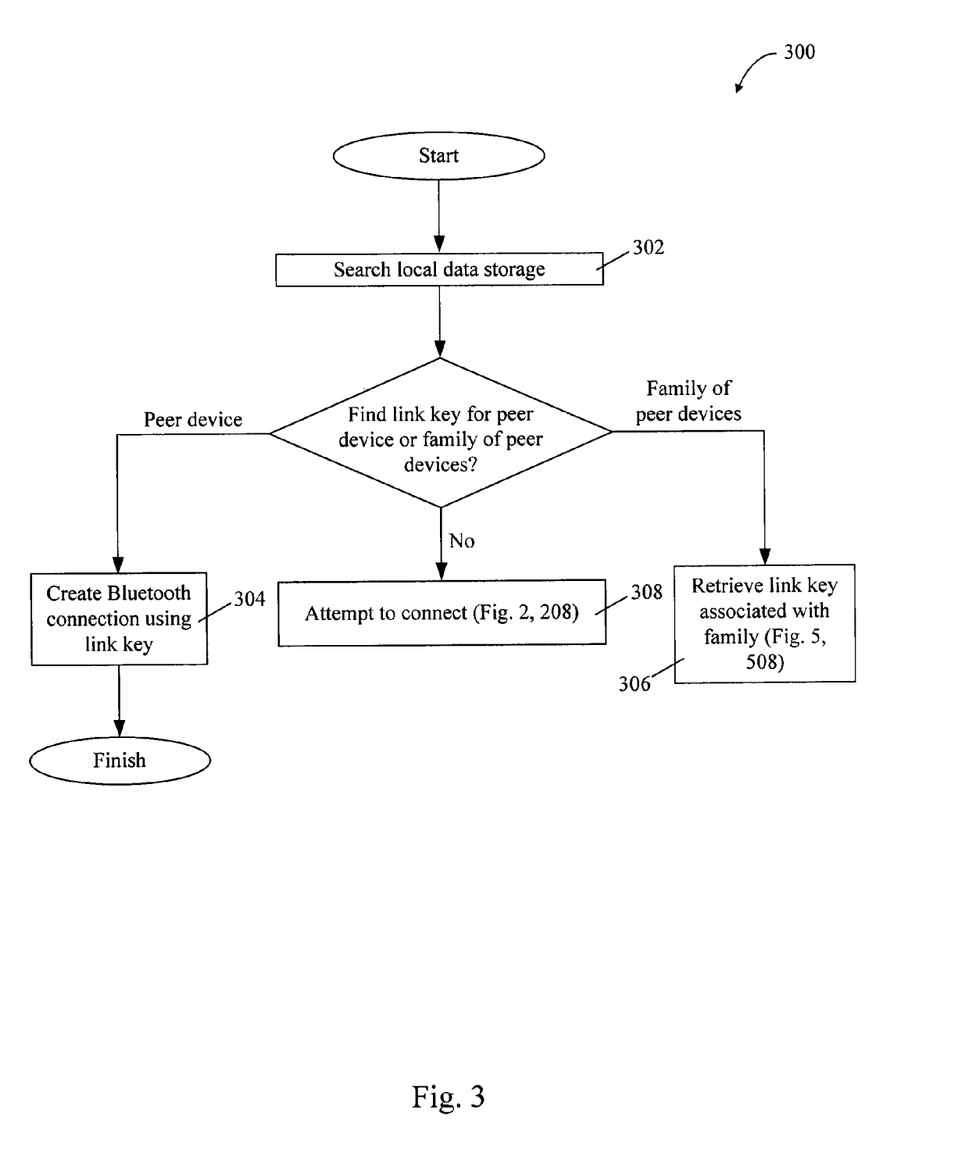
FIG. 3 is a flowchart 300 illustrating a method for a user device to determine whether it has previously paired with a peer device or family of peer devices in accordance with an embodiment of the invention.

FIG. 3 is a flowchart 300 illustrating a method for a user device to determine whether it has previously paired with a peer device or family of peer devices in accordance with an embodiment of the invention. Specifically, FIG. 3 illustrates how, according to an embodiment of the invention, user device 110 can determine whether it has previously paired with peer device 120 or another peer device in the family of peer devices 120-128 to which peer device 120 belongs.

In step or stage 302, user device 110 searches its local data storage for any indication of a previous pairing with peer device 120 or another peer device in family of peer devices 120-128. To determine whether user device 110 has previously paired with peer device 120, user device 110 may search for the Bluetooth address of peer device 120 and determine whether or not a link key (i.e., data used to enable authentication and secure data transfer between two Bluetooth devices) is stored for that address. In the event user device 110 finds an indication of such a pairing (e.g., a link key is stored for the Bluetooth address of peer device 120), as illustrated in step or stage 304, user device 110 may create a Bluetooth connection using all or part of such found information (e.g., the link key). If user device 110 fails to find any indication of a pairing with peer device 120, user device 110 may then determine whether it has previously paired with another peer device in family of peer devices 120-128.

To determine whether user device 110 has previously paired with another peer device in the family of peer devices 120-128 to which peer device 120 belongs, user device 110 may, as illustrated in step or stage 302, search for the UUID presented by peer device 120 and determine whether or not a link key is stored for the UUID. In the event user device 110 finds an indication of such a pairing (e.g., a link key is stored for the UUID presented by peer device 120), as illustrated in step or stage 306, user device 110 may then retrieve the link key as further described in step or stage 508 of FIG. 5. If, however, user device 110 determines that a pairing has not previously been made with either peer device 120 or another member of family of peer devices 120-128, and user device 110 wishes to receive access to or establish communications with one or more members of family of peer devices 120-128, then, as illustrated in step or stage 308, user device 110 may attempt to connect to peer device 120 as further described in step or stage 208 of FIG. 2.

Embodiments of the invention include methods, in addition to that described with reference to FIG. 3, for a user device to determine whether it has previously paired with a peer device or family of peer devices. Such embodiments may, as previously described, utilize the additional family-specific information to enable a user device to effectively perform subsequent processing for creating Bluetooth connections.

For example, in one embodiment, if peer device 120 does not present a UUID or presents a null UUID (or presents some other indication that peer device 120 is not a member of a family of peer devices), then user device 110, in step or stage 302, may search its local data storage for any indication of a previous pairing with peer device 120 but not for another peer device in family of peer devices 120-128. Such a limited search decreases the response time of user device 110, thus increasing the speed at which user device 110 may establish a connection with peer device 120.

In another example embodiment, if peer device 120 includes a UUID which identifies family of peer devices 120-128 (or presents some other indication that peer device 120 is a member of a family of peer devices), then user device 110, in step or stage 302, may search its local data storage for any indication of a previous pairing with family of peer devices 120-128 but not for peer device 120. Such a limited search decreases the response time of user device 110, thus increasing the speed at which user device 110 may establish a connection family of peer devices 120-128.

In yet another example embodiment, the provision or lack thereof of a UUID (or other information indicating whether a peer device is a member of a family of peer devices) may alter the order of a search by user device 110 in its local data storage. That is, user device 110 may first search for any indication it has previously paired with peer device 120, followed by a second search for any indication that it has previously paired with another peer device in family of peer devices 120-128. User device 110 may search in this order if peer device 120 does not present a UUID or presents a null UUID (or presents some other indication that peer device 120 is a member of a family of peer devices). Alternatively, user device 110 may first search for any indication it has previously paired with another peer device in family of peer devices 120-128, followed by a second search for any indication that it has previously paired with peer device 120. User device 110 may search in this order if peer device 120 does present a UUID or presents a null UUID (or presents some other indication that peer device 120 is not a member of a family of peer devices).

It should be noted that although the steps or stages discussed with reference to FIG. 3 emphasize use of the Bluetooth protocol, in some embodiments of the invention other wired or wireless communication methods or protocols may be used. For example, Zigbee or Bluetooth Low Energy may be used.

Returning now to FIG. 2, in step or stage 208, user device 110 attempts to connect to peer device 120. This may be done by using a standard Bluetooth communication protocol for newly-introduced devices (for example, by initiating a connection attempt).

In response to receiving a connection attempt, as illustrated in step or stage 210, peer device 120 determines whether a previous pairing was made with user device 110 by peer device 120 or any other members of family of peer devices 120-128. Peer device 120 may make such a determination through appropriate analysis of records stored locally on peer device 120, records stored on data storage and retrieval system 140, or records stored in some other medium accessible to peer device 120. According to one embodiment of the invention, such a determination is further described with reference to FIG. 4.

Figure 4:
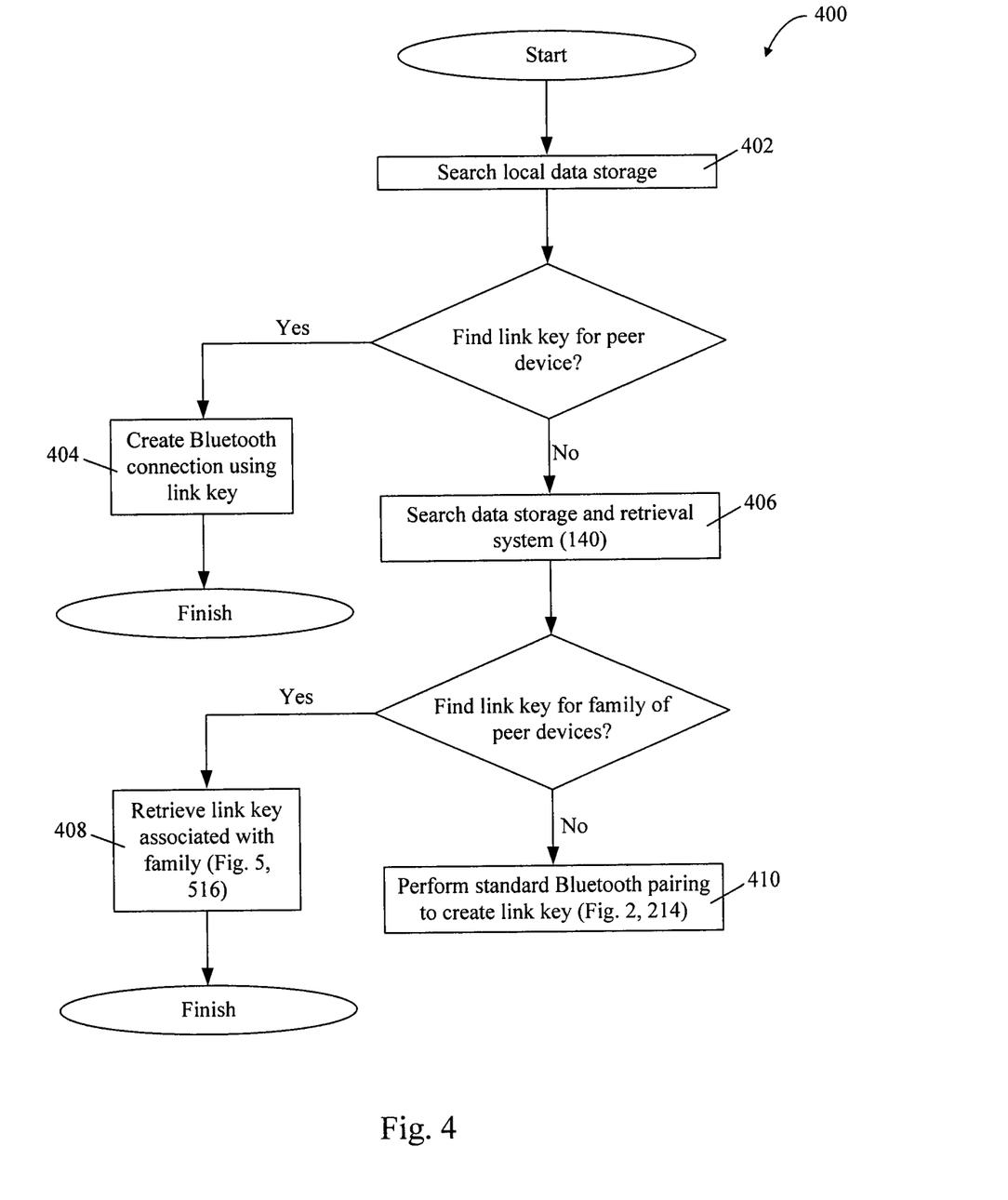
FIG. 4 is a flowchart 400 illustrating, in accordance with an embodiment of the invention, a method for a peer device to determine whether it or another member of a family of peer devices to which it belongs has previously paired with a user device.

FIG. 4 is a flowchart 400 illustrating, in accordance with an embodiment of the invention, a method for a peer device to determine whether it or another member of a family of peer devices to which it belongs has previously paired with a user device. Specifically, FIG. 4 illustrates how, according to an embodiment of the invention, peer device 120 can determine whether it has previously paired with user device 110 or whether another member of family of peer devices 120-128 to which peer devices 120 belongs has previously paired with user device 110.

In step or stage 402, peer device 120 searches its local data storage, cache, memory, etc. for any indication that it has previously paired with user device 110. To determine whether peer device 120 had previously paired with user device 110, peer device 120 may search for the Bluetooth address of user device 110 and determine whether or not a link key is stored for that address. In the event peer device 120 finds an indication of a previous pairing with user device 110 (e.g., a link key is stored for the Bluetooth address of user device 110), as illustrated in step or stage 404, peer device 120 may create a Bluetooth connection using all or part of such found information (e.g., the link key). If peer device 120 fails to find any indication that it has previously paired with user device 110, peer device 120 may then determine whether another peer device in family of peer devices 120-128 has previously paired with user device 110.

To determine whether another peer device in family of peer devices 120-128 has previously paired with user device 110, peer device 120 may, as illustrated in step or stage 406, search data storage and retrieval system 140 for any indication of such a pairing. For example, peer device 120 may search for records, provided by peer devices in family of peer devices 120-128 other than peer device 120, which associate a link key with user device 110. In the event peer device 120 finds an indication of such a pairing (e.g., a record is stored associating a link key with the Bluetooth address of user device 110), as illustrated in step or stage 408, peer device 120 may then retrieve the link key as further described in step or stage 516 of FIG. 5. If, however, peer device 120 does not find an indication of such a pairing (e.g., no record is stored for the Bluetooth address of user device 110), then as illustrated in step or stage 410, peer device 120 may perform standard Bluetooth pairing to create a link key as further described in step or stage 214 of FIG. 2.

Embodiments of the invention include methods, in addition to that described with reference to FIG. 4, for a peer device to determine whether it or another member of a family of peer devices to which it belongs has previously paired with a user device. Such embodiments may, as previously described, utilize the additional family-specific information to enable a peer device to effectively perform subsequent processing for creating Bluetooth connections.

For example, in one embodiment, if peer device 120 does not have a UUID to present or presents a null UUID (or otherwise has information indicating that peer device 120 is not a member of a family of peer devices), then peer device 120, while searching a local data storage as described with reference to step or stage 402, may not perform the subsequent search in data storage and retrieval system 140 as described with reference to step 406. Rather, if peer device 120 fails to find an indication of a previous pairing with user device 110 (e.g., fails to find a link key associated with user device 110), peer device 120 may immediately perform standard Bluetooth pairing to create a link key as described with reference to step or stage 410. Such a limited search decreases the response time of peer device 120, thus increasing the speed at which peer device 120 may establish a connection with user device 110.

It should be noted that although the steps or stages discussed with reference to FIG. 4 emphasize use of the Bluetooth protocol, in some embodiments of the invention other wired or wireless communication methods or protocols may also be used. For example, Zigbee or Bluetooth Low Energy may be used.

Returning to FIG. 2, in accordance with the embodiment illustrated, peer device 120 determines that neither it nor any other peer device in family of peer devices 120-128 has previously paired with user device 110. After peer device 120 makes such a determination, as illustrated in step or stage 212, peer device 120 and user device 110 engage in a pairing process as defined by the Bluetooth specifications. For example, this may be a Secure Simple Pairing process. As a result of the pairing process, user device 110 and peer device 120 become paired and connected, and a link key is generated which can be used in the future to prevent the need for another pairing process between user device 110 and peer device 120. In some embodiments of the invention, and as will be described with reference to FIG. 5, this link key may also be used to prevent the need for a pairing process between user device 110 and other peer devices in family of peer devices 120-128.

After user device 110 and peer device 120 are paired and connected, user device 110 and peer device 120 may each generate unique records and individually store the link key for subsequent use. Specifically, in step or stage 214 user device 110 generates a record associating the link key with family of peer devices 120-128. For example, user device 110 may generate a key-value pair, with the key being the UUID for family of peer devices 120-128 (as given by the EIR data, SDP record, or another suitable source of this information) and the value being the link key. In step or stage 216, user device 110 stores the record (i.e., the key-value pair and its contents) in a local database. Note that by performing steps 214 and 216, the link key may subsequently be retrieved for use when user device 110 tries to connect to other members of family of peer devices 120-128.

In step or stage 218, peer device 120 generates a record associating the link key with user device 110. For example, peer device 120 may generate a key-value pair, with the key being the Bluetooth address of user device 110 and the value being the link key. The record (i.e., the key-value pair and its contents) may be stored in a local database (e.g., within peer device 120). In some embodiments of the invention, and as illustrated in step or stage 220, instead of, or in addition to, storing the record locally, peer device 120 may cause the record to be stored in data storage and retrieval system 140. For example, in the case where storage and retrieval system 140 is a SQL database, peer device 120 might generate and store the record in data storage and retrieval system 140 by sending a query such as:

INSERT INTO pairing_table (bluetooth address, link_key) VALUES (XXXXXXX, YYYYYYYY), where XXXXXXX represents the Bluetooth address of user device 110 and YYYYYYYY represents the link key or similar data.

Optionally, data storage and retrieval system 140 may confirm that the record has been successfully stored. By storing the record in data storage and retrieval system 140, the link key (or other security, identification, or authentication data) may be accessed by other members of family of peer devices 120-128 as part of a pairing process.

It should be noted that although the steps or stages discussed with reference to FIG. 2 emphasize use of the Bluetooth protocol, in some embodiments of the invention other wired or wireless communication methods or protocols may be used. For example, Zigbee or Bluetooth Low Energy may be used.

Figure 5:
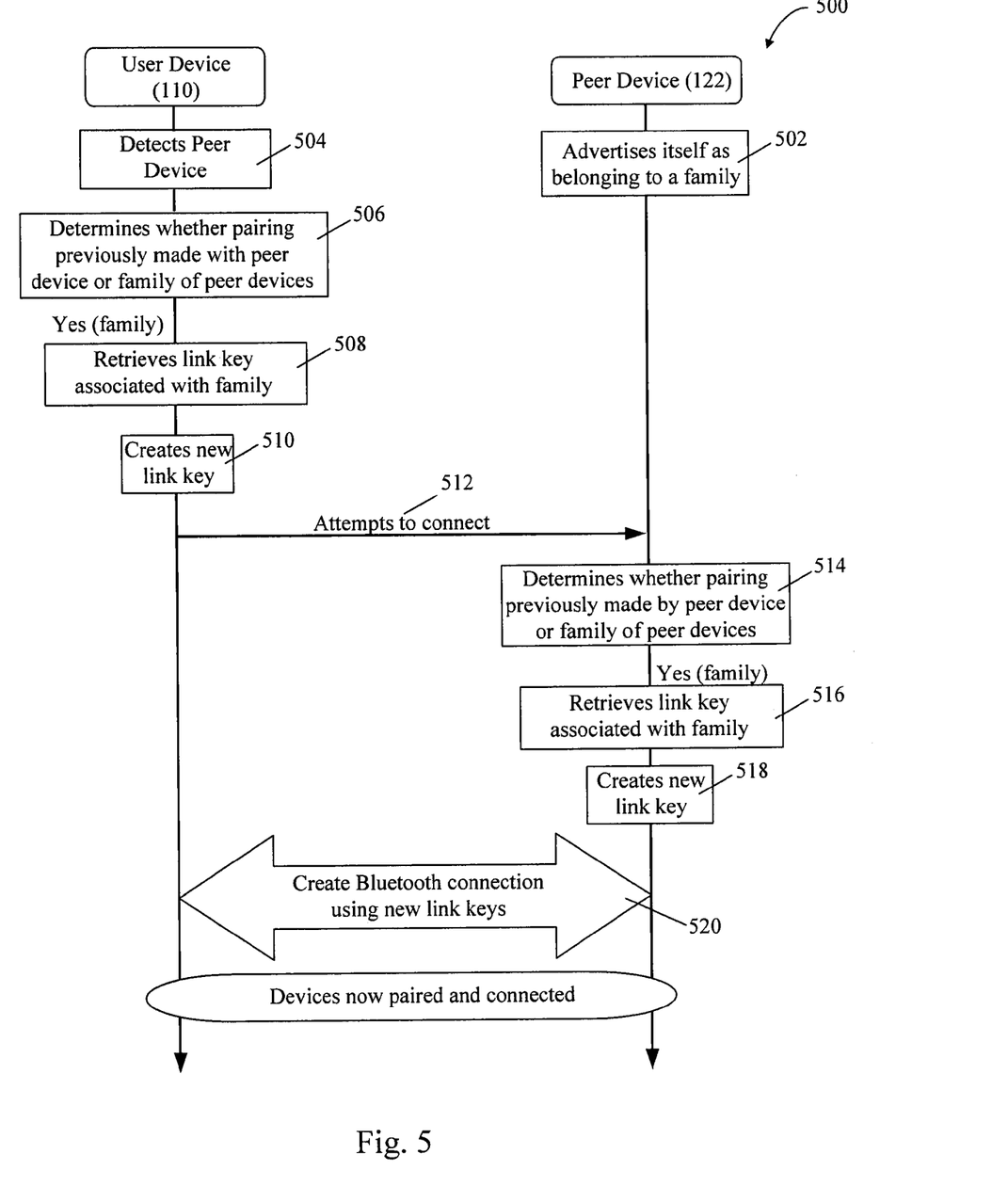
FIG. 5 is a flowchart 500 illustrating a sequence of events for connecting user device 110 to another peer device 122 of family of peer devices 120-128 in accordance with an embodiment of the invention.

FIG. 5 is a flowchart 500 illustrating a sequence of events for connecting user device 110 to another peer device 122 of family of peer devices 120-128 in accordance with an embodiment of the invention. Specifically, FIG. 5 illustrates how user device 110 and peer device 122 can use the results of a previous pairing operation between user device 110 and peer device 120 (such as is described with reference to FIG. 2) to establish a Bluetooth connection.

Note that in accordance with embodiments of the invention, this process of establishing a communications capability with a new peer device (i.e., a peer device with which user device 110 had not previously been paired) that is part of family of peer devices 120-128 occurs without the need for a formal pairing process between user device 110 and the new peer device. This saves time and the need for the user interactions that are part of a standard pairing process. In addition, user device 110 does not need to enter into a pairing mode, and so may be able to continue performing other operations that are not normally compatible with a pairing mode (in the case of a Bluetooth headset, for example, an operation such as maintaining a telephony call). The inventive process may also limit potential security vulnerabilities associated with a pairing operation as the process of providing the pairing key or other pairing related data may be performed in a manner that is more secure than a standard over-the-air pairing operation.

In some embodiments, steps 502, 504 and 506 are similar to steps 202, 204, and 206 described with reference to FIG. 2. That is, in step or stage 502, peer device 122 advertises itself as being available for communications similar to peer device 120 described in step or stage 202. In step or stage 504, user device 110 attempts to detect a suitable peer device, as is done in step or stage 204. And in step or stage 506, similar to step or stage 206 in relation to peer device 120, user device 110 determines whether it has previously paired with peer device 122 or family of peer devices 120-128.

While FIG. 2 illustrates the case where user device 110 determines that a pairing has not previously been made with peer device 120 or any other member of family of peer devices 120-128, the following embodiment illustrates the case where user device 110 determines that a pairing has previously been made with a member of family of peer devices 120-128. That is, user device 110, although not having previously established communications with peer device 122, had previously established communications with another peer device of the family of peer devices 120-128 to which peer device 122 belongs (i.e., peer device 120). As previously described, this may be determined using the Bluetooth address, SDP records, EIR data, or another suitable source of data presented to user device 110 by peer device 122. In such a case, user device 110 subsequently performs some or all of the additional steps as described herein.

In step or stage 508, user device 110 retrieves a link key associated with family of peer devices 120-128. In one embodiment of the invention, this may be performed by identifying the record which includes family of peer devices 120-128 and reading the corresponding link key. For example, where a key-value pair is used, with the key being the UUID for family of peer devices 120-128 and the value being the link key, user device 110 may identify the key-value pair having a UUID which matches the UUID presented by peer device 122 and use the corresponding value as the link key for peer device 122.

In step or stage 510, user device 110 creates a new link key by associating the retrieved link key with the address of peer device 122. For example, user device 110 may create a local device database entry using the Bluetooth address of peer device 122 and the retrieved link key, by calling a function equivalent to:

BluetoothCreatePairedDeviceEntry(BluetoothAddress, FamilyLinkKey), where the BluetoothAddress used is the Bluetooth address of the peer device with which user device 110 is about to connect (i.e., peer device 122), and the FamilyLinkKey is the retrieved link key.

In step or stage 512, user device 110 attempts to connect to peer device 122 in a process similar to the connection attempt described with reference to step or stage 208. In response to receiving a connection attempt, as illustrated in step or stage 514, peer device 122 determines whether a previous pairing was made with user device 110 by peer device 122 or any other members of family of peer devices 120-128. According to one embodiment of the invention, such a determination is made as previously described with reference to FIG. 4. In the example illustrated in FIG. 5, peer device 122 determines that user device 110 has previously paired with another peer device in family of peer devices 120-128. That is, peer device 122 determines that user device 110 has previously paired with peer device 120.

In step or stage 516, after peer device 122 determines that user device 110 has previously paired with another peer device (e.g., peer device 120) in family of peer devices 120-128, peer device 122 retrieves a link key associated with family of peer devices 120-128. According to one embodiment of the invention, data storage and retrieval system 140 may store link keys or other connection data for family of peer devices 120-128, where such information indicates which user devices, if any, one or more of the peer devices of family of peer devices 120-128 has previously paired with. For example, to retrieve a link key from storage and retrieval system 140, where data storage and retrieval system 140 is a SQL database, peer device 122 might send a query such as:

SELECT link_key FROM pairing_table WHERE bluetooth_address=XXXXXXX, where XXXXXX represents the actual Bluetooth address of user device 110. In the case where a link key for user device 110 is already stored as a result of a previous pairing operation, such a query would return a link_key value. The link_key value may then be used to create a new link key. On the other hand, in the case where no prior pairing process has occurred (and as a result, no link key was stored), a null result would be returned to the query.

In step or stage 518, peer device 122 creates a new link key by associating the retrieved link key with itself. For example, peer device 122 may create a local database entry (e.g., a database entry in its own data storage, memory, cache, etc.) using the Bluetooth address of user device 110 and the retrieved link key, by calling a function equivalent to:

BluetoothCreatePairedDeviceEntry(BluetoothAddress, FamilyLinkKey), where the BluetoothAddress is the Bluetooth address of user device 110, and the FamilyLinkKey is the retrieved link key.

In step or stage 520, a Bluetooth connection is created between user device 110 and peer device 122 using the new link key created in step or stage 510 and the new link key created in step or stage 518. As a result, the connection attempt received from user device 110 will be accepted by peer device 122. Note that in accordance with embodiments of the invention, this connection is made without user device 110 and peer device 122 undergoing an explicit pairing process, without user interaction, and substantially more quickly than a normal pairing operation, as it does not require user device 110 or peer device 122 to enter into a pairing mode. As discussed, this ensures that functions that might be disabled or negatively impacted in a standard pairing mode continue to be provided, and that any security vulnerabilities associated with a standard pairing mode are not exposed.

As previously mentioned, data storage and retrieval system 140 illustrated in FIG. 1 and discussed with respect to FIG. 2, FIG. 4, and FIG. 5, is optional. Where data storage and retrieval system 140 is not provided, other techniques may be used for peer devices 120, 122 to obtain and store information indicating prior pairings (e.g., link keys).

For example, in one embodiment, a communication protocol may be used which allows a peer device in family of peer devices 120-128 to share link key data over communications network 130 to other peer devices in family of peer devices 120-128. For example, in step or stage 220, instead of, or in addition to, storing the record in data storage and retrieval system 140, peer device 120 may broadcast the record over communications network 130 so that other peer devices, such as peer device 122, may store the record in their local data storage. As a result, in step or stage 514, instead of searching data storage and retrieval system 140 for an indication that another peer device (such as peer device 120) in family of peer devices 120-128 has previously paired with user device 110, peer device 122 may search its local data storage.

In another example embodiment, a communication protocol may be used which allows a peer device (such as peer device 122) to make a request for a link key over the communication network 130, to which another peer device (such as peer device 120) in family of peer devices 120-128, which has a copy of the data, may respond. For example, in step or stage 514, instead of, or in addition to, searching data storage and retrieval system 140 for an indication that another peer device (such as peer device 120) in family of peer devices 120-128 has previously paired with user device 110, peer device 122 may submit a request for a link key over communication network 130. Further, in step or stage 516, instead of, or in addition to, peer device 122 retrieving a link key from data storage and retrieval system 140, peer device 120 may provide the link key to peer device 122 in response to receiving the request over communication network 130.

In yet another example embodiment, link key data may be shared over the communications network 130 with a subset of family of peer devices 120-128. The subset may be determined based on location, proximity to user device 110, a function of the peer device or devices receiving the link key, etc. For example, if data storage and retrieval system 140 is not provided, in step or stage 220, instead of storing the record in data storage and retrieval system 140, peer device 120 may broadcast the record over communications network 130 to a select subset of family of peer devices 120-128 (e.g., peer devices 120-124). For another example, if data storage and retrieval system 140 is provided, data storage and retrieval system 140 may send a copy of the stored link key data to a select subset of family of peer devices 120-128. For yet another example, if data storage and retrieval system 140 is provided, a central data processor or computing device may have access to data storage and retrieval system 140. In such a case, the central data processor or computing device may access the link key from data storage and retrieval system 140 and send a copy of the link key to a subset of family of peer devices 120-128.

In yet another example embodiment, the link key data transferred to a peer device (e.g., peer device 120 or peer device 122), family of peer devices 120-128, a subset of family of peer devices 120-128, and/or data storage and retrieval system 140, may have a predetermined lifetime. As a result, the link key data may expire or be removed from the peer device(s) and/or data storage and retrieval system 140 after a set amount of time. This may be used to increase the security of the pairing operations and associated systems by limiting the active lifetime of link key data and thereby requiring the performance of a specified security protocol in order to re-establish a secure process.

It should be noted that although the steps or stages discussed with reference to FIG. 5 emphasize use of the Bluetooth protocol, in some embodiments of the invention other wired or wireless communication methods or protocols may be used. For example, Zigbee or Bluetooth Low Energy may be used.

Figure 6A:
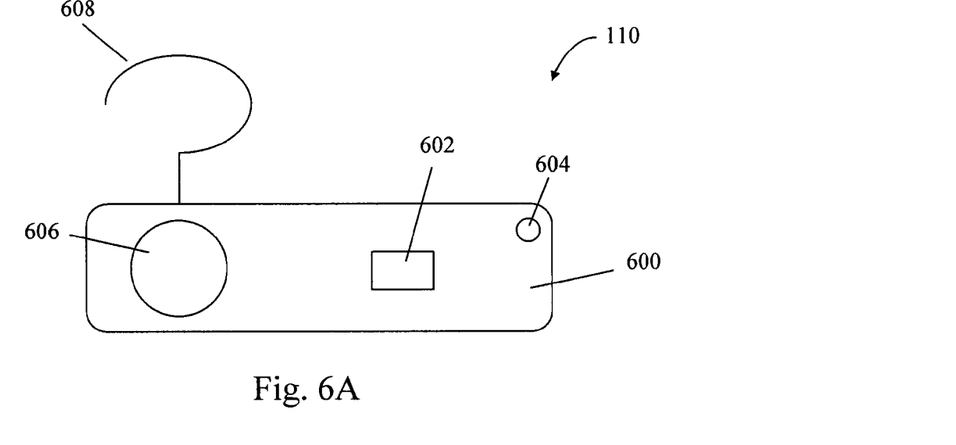
FIG. 6A is a block diagram illustrating components of a Bluetooth-enabled personal user device 110 according to an embodiment of the invention.

FIG. 6A is a block diagram illustrating components of a Bluetooth-enabled personal user device 110 according to an embodiment of the invention. According to one embodiment, user device 110 includes a housing 600, a processing element 602, a microphone 604, a speaker 606, and a physical coupler 608. Housing 600 encapsulates processing element 602, microphone 604, and speaker 606. Processing element 602 includes various electronic components for operating personal user device 110. Microphone 604 is electronically coupled to processing element 602 and functions to receive audio signals from a user. Speaker 606 is electronically coupled to processing element 602 and functions to communicate audio signals to the user.

Physical coupler 608 is in a curved shape and is attached to housing 600 for enabling housing 600 to be physically coupled to the user. User device 110 need not include all of the components illustrated in FIG. 6A, and may include additional elements not illustrated in FIG. 6A. For example, in other embodiments, speaker 606 and/or microphone 604 is not included. In other example embodiments, physical coupler 608 is formed as part of housing 600. In yet other example embodiments, speaker 606 and/or microphone 604 are separate components physically coupled to an exterior of housing 600.

Figure 6B:
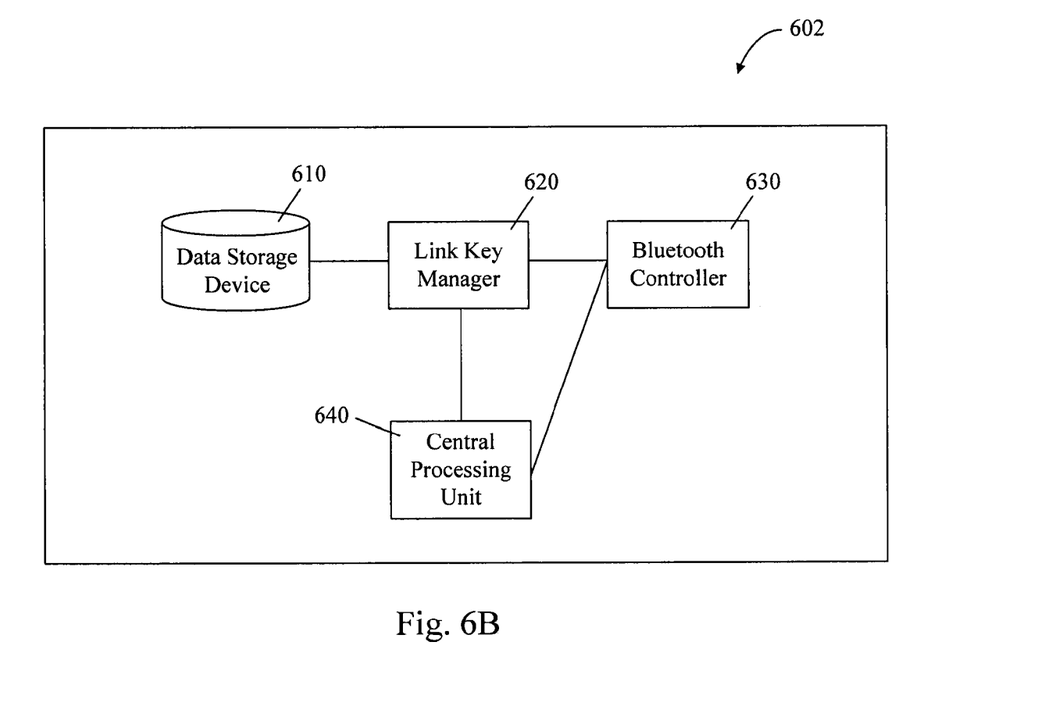
FIG. 6B is a block diagram illustrating components of a processing element 602 of a Bluetooth-enabled personal user device 110 that may be used as part of embodiments of the invention.

FIG. 6B is a block diagram illustrating components of a processing element 602 of a Bluetooth-enabled personal user device 110 that may be used as part of embodiments of the invention. According to one embodiment of the invention, processing element 602 includes a data storage device 610, a link key manager 620, a Bluetooth controller 630, and a central processing unit 640, all of which may be implemented as hardware and/or software elements interconnected to one another and operable to perform the previously described functionality of user device 110 (e.g., one or more of the steps or stages described with reference to FIG. 2, FIG. 3, FIG. 4, or FIG. 5). According to another embodiment of the invention, some of the elements are provided external to processing element 602. For example, data storage device 610 may be located separately from processing element 602.

In some embodiments of the invention, some or all of these components of processing element 602 may be provided by a single integrated circuit, for example by the BlueCore family (e.g., BC04) made by Cambridge Silicon Radio. In other embodiments, these components be provided by multiple integrated circuits, for example an ARM-based microcontroller for link key manager 620 and data storage device 610.

According to yet other embodiments of the invention, a suitably programmed computing device, data processor, or microprocessor may be used to implement the previously described functionality of user device 110 (e.g., one or more of the steps or stages described with reference to FIG. 2, FIG. 3, FIG. 4, or FIG. 5), where the instructions to be executed may be stored in a suitable data storage device or memory coupled to the computing device, data processor, or microprocessor.

Generally, data storage device 610 operates to store information such as link keys and records associating link keys with families. Link key manager 620 operates to manage link keys and access to link keys and records stored in data storage device 610. Bluetooth controller 630 operates to transmit and receive data with other Bluetooth-enabled devices, as defined by the Bluetooth protocols and specification. Central processing unit 640 operates to manage processing by and between data storage 610, link key manager 620, and Bluetooth controller 630, as well as perform some or all of the standard functions of user device 110.

In one embodiment of the invention, the components of user device 110 operate to execute the tasks discussed with respect to the embodiments described in FIG. 2, FIG. 3, FIG. 4, or FIG. 5. For example, Bluetooth controller 630 may detect a peer device as described in steps 204 and 504 and subsequently provide to link key manager 620 the properties of the detected device (e.g., a hardware address, SDP record, and/or EIR record). Link key manager 620 may then determine whether pairing has previously been made with the detected device or a family of devices to which the detected device may belong, as described in steps 206 and 506. Link key manager 620 may do this by searching data storage device 610 as described in step or stage 302.

If link key manager 620 determines that a pairing has not previously been made with either the detected device or a family of devices to which the detected device belongs, link key manager 620 may instruct Bluetooth controller 630 to perform a standard Bluetooth pairing with the detected device. As a result, Bluetooth controller 630 may attempt to connect with the detected device, as described in step or stage 308, and subsequently perform standard Bluetooth pairing with the detected device to create a link key as described in step or stage 212. Once a link key has been created, link key manager 620 may then generate a record associating the link key with the family, as described in step or stage 214, and store the record in data storage device 610, as described in step or stage 216.

On the other hand, if link key manager 620 determines that a pairing has previously been made with the family of devices to which the detected device belongs, link key manager 620 may retrieve the appropriate link key for the family from data storage device 610, as described in step or stage 308, and subsequently create a new link key as described in step or stage 510. Link key manager 620 may then instruct Bluetooth controller 630 to attempt to connect with the detected device, as described in step or stage 512, and subsequently use the new link key to create a Bluetooth connection. Bluetooth controller 630 may then attempt to connect with the detected device, as described in step or stage 512, and subsequently create a Bluetooth connection with the detected device using the new key, as described in step or stage 620.

Figure 7A:
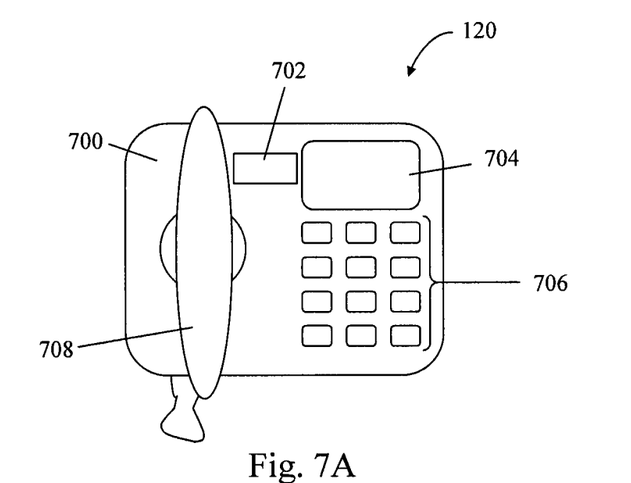
FIG. 7A is a block diagram illustrating components of a Bluetooth-enabled peer device 120 according to an embodiment of the invention.

FIG. 7A is a block diagram illustrating components of a Bluetooth-enabled peer device 120 according to an embodiment of the invention. According to one embodiment, peer device 120 includes a housing 700, a processing element 702, a visual display 704, a keyboard 706, and a handset 708. Housing 700 encapsulates processing element 702. Processing element 702 includes various electronic components for operating peer device 120. Display screen 704 is electronically coupled to processing element 702 and functions to display information to a user. Keyboard 706 is electronically coupled to processing element 702 and functions to receive input from the user. Handset 708 may include additional components such as a microphone and speaker (not illustrated), which may respectfully function to receive audio signals from and communicate audio signals to the user. Peer device 120 need not include all of the components illustrated in FIG. 7A, and may include additional elements not illustrated in FIG. 7A. For example, in other embodiments, visual display 704 and/or keyboard 706 is not included. In other example embodiments, a touch screen is provided which may display information to the user and allow the user to input information into the peer device 120. In yet other embodiments, the microphone and speaker (not illustrated) may be included within housing 700 instead of or in addition to handset 708.

Figure 7B:
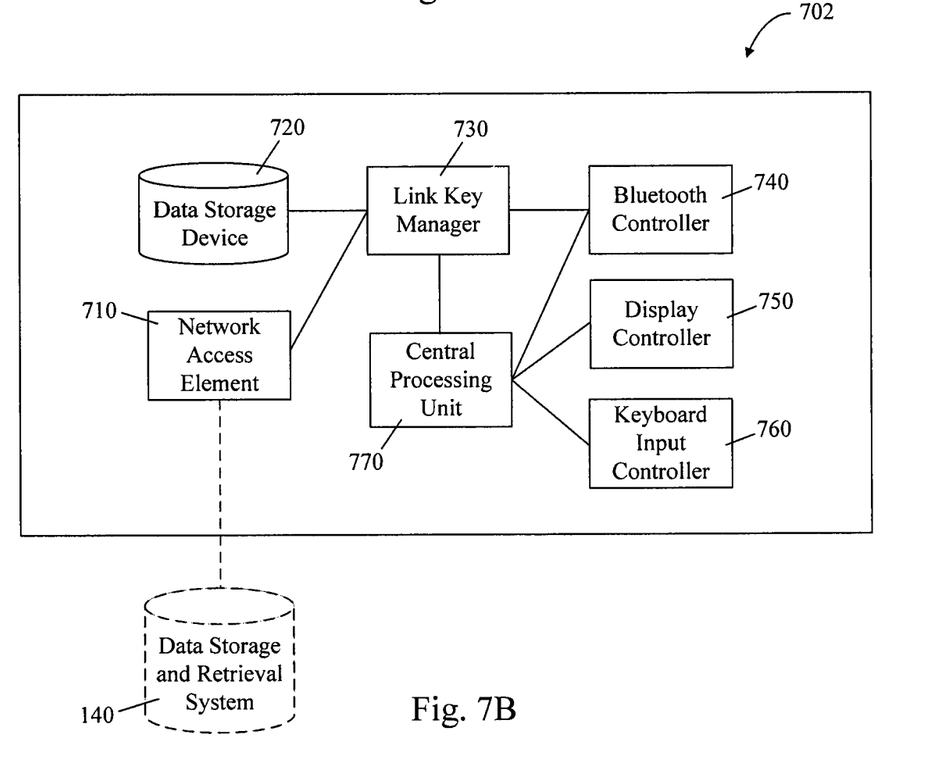
FIG. 7B is a block diagram illustrating components of a processing element 702 of a Bluetooth-enabled peer device 120 that may be used as part of embodiments of the invention.

FIG. 7B is a block diagram illustrating components of a processing element 702 of a Bluetooth-enabled peer device 120 that may be used as part of embodiments of the invention. According to one embodiment of the invention, processing element 702 includes a network access element 710, a data storage device 720, a link key manager 730, a Bluetooth controller 740, a display controller 750, a keyboard input controller 760, and a central processing unit 770, all of which may be implemented as hardware and/or software elements interconnected to one another and operable to perform the previously described functionality of one or more peer devices in family of peer devices 120-128 (e.g., one or more of the steps or stages described with reference to FIG. 2, FIG. 3, FIG. 4, or FIG. 5). According to another embodiment of the invention, some of the elements are provided external to processing element 702. For example, display controller 740 and/or keyboard input controller 750 may be located separately from processing element 702.

In some embodiments of the invention, some or all of these components of processing element 702 may be provided by a single integrated circuit, for example by the BlueCore family (e.g., BC04) made by Cambridge Silicon Radio. In other embodiments, these components be provided by multiple integrated circuits, for example an ARM-based microcontroller for link key manager 730.

According to yet other embodiments of the invention, a suitably programmed computing device, data processor, or microprocessor may be used to implement the previously described functionality of one or more peer devices in family of peer devices 120-128 (e.g., one or more of the steps or stages described with reference to FIG. 2, FIG. 3, FIG. 4, or FIG. 5), where the instructions to be executed may be stored in a suitable data storage device or memory coupled to the computing device, data processor, or microprocessor.

As previously discussed, remote data storage and retrieval system 140 may be a computer server running an operating system and a SQL server, such as MySQL or SQL Server. In the case where the family of peer devices is associated with a UUID, according to one embodiment of the invention, the SQL server may contain a table, with a first column containing the UUID and the second column containing the link key, with one row for each family of devices.

Generally, network access element 710 operates to permit other elements of peer device 120, such as link key manager 730, to access remote data storage and retrieval system 140. Network access element 710 might be implemented by a microcontroller with MAC+PHY, together with a software TCP/IP stack and code sufficient to send and receive SQL commands remotely. Alternatively, it might be a Wi-Fi chip with an integrated TCP/IP stack. Data storage device 720 operates to manage link keys and access to link keys and records stored in data storage device 720, where the link keys and records are for previous Bluetooth connections which peer device 120 has engaged in. Link key manager 730 operates to manage link keys and access to link keys and records stored in the remote data storage and retrieval system 140, where the link keys and records are for previous Bluetooth connections which peer device 120 may not have engaged in. Bluetooth controller 740 operates to transmit and receive data with other Bluetooth-enabled devices, as defined by the Bluetooth protocols and specification. Display controller 750 operates to control the display of information on visual display 704, and keyboard input controller 760 operates to receive and process input received from the user via keyboard 706. Central processing unit 770 operates to manage processing by and between network access element 710, data storage device 720, link key manager 730, Bluetooth controller 740, display controller 750, and keyboard input controller 760, as well as perform some or all of the standard functions of peer device 120.

In one embodiment of the invention, the components of peer device 120 operate to execute the tasks discussed with respect to the embodiments described in FIG. 2, FIG. 3, FIG. 4, or FIG. 5. For example, Bluetooth controller 740 may advertise the peer device as belonging to a family of devices, as described in steps 202 and 302. In response to a connection attempt, link key manager 730 may then determine whether a pairing with the requesting device has previously been made by the peer device or another member of family of peer devices 720-728, as described in steps 210 and 514. Link key manager 730 may do this by searching data storage device 720, as described in step 402. Link key manager 730 may also do this by instructing network access element 710 to search data storage and retrieval system 140 as described in step 406.

If the link key manager 730 determines that a pairing has not previously been made by either the peer device or the family of peer devices to which the peer device belongs, link key manager 730 may instruct Bluetooth controller 740 to perform a standard Bluetooth pairing with the requesting device. As a result, Bluetooth controller 740 may respond to the connection attempt by performing a standard Bluetooth pairing to create a link key as described in step or stage 212. Once a link key has been created, link key manager 730 may then generate a record associating the link key with the requesting device, as described in step or stage 214. Link key manager 730 may then store the record in data storage device 720, and/or instruct network access element 710 to store the record in data storage and retrieval system 140.

On the other hand, if link key manager 730 determines that a pairing has previously been made by the family of devices to which the peer device belongs, link key manager 730 may retrieve the appropriate link key by, for example, instructing network access element 710 to retrieve the link key from data storage and retrieval system, and described in step or stage 516. Link key manager 730 may then create a new link key as described in step or stage 518, and instruct Bluetooth controller 740 to create a Bluetooth connection with the requesting device using the net link key. Bluetooth controller 740 may then create a Bluetooth connection with the requesting device using the new link key as described in step or stage 520.

As should be understood by the foregoing, within the known art inefficiencies may occur when a user of a communication device, such as a Bluetooth-enabled user device, desires to connect to a family of communication devices, such as Bluetooth-enabled peer devices. Such inefficiencies occur due to the requirement for explicit pairing/authenticating operations with each member in the family of communication devices.

According to some embodiments of the invention, these inefficiencies may be overcome by the use of family keys. That is, a user device, after performing a pairing/authentication operation with a peer device, may generate and store a record associating a link key with the family of peer devices to which the peer device belongs. The user device may then subsequently use this link key when connecting to other members of the family in order to avoid performing subsequent pairing/authentication operations. Similarly, a peer device, after performing a pairing/authentication operation with a user device, may generate and store a record associating a link key with the user device. The peer device may make this link key available to other members of the family of peer devices to which the peer device belongs. Accordingly, the other members may subsequently use this link key when connecting to the peer device in order to avoid performing subsequent pairing/authentication operations. By avoiding pairing/authentication operations, a user device may connect to a family of peer devices more expediently than otherwise possible.

According to some embodiments of the invention, additional efficiencies are realized via the use of family advertising by peer devices. That is, a peer device may present information indicating it is a member of a particular family of peer devices. By the presentation of such information, the user device and peer devices may perform focused searches for link keys, thereby limiting the number of operations required to establish a connection and consequently further increasing the speed at which a user device may connect to a family of peer devices.

It should be understood that the invention as described above can be implemented in the form of control logic using computer software in a modular or integrated manner. Based on the disclosure and teachings provided herein, a person of ordinary skill in the art will know and appreciate other ways and/or methods to implement the invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method for establishing communications between a user device and a peer device, the method comprising the user device:
detecting a peer device that is wirelessly broadcasting a custom Universally Unique Identifier (UUID) that advertises the peer device as belonging to a family of peer devices;
determining, using the custom UUID, whether a pairing has previously been made with the peer device or any other peer device in the family of peer devices, or whether the custom UUID indicates the peer device does not belong to the family of peer devices;
if the pairing has previously been made, establishing a connection with the peer device using a previously stored link key;
if the pairing has not previously been made, performing a pairing operation with the peer device to create a link key and generating a record associating the link key with the family of peer devices; and
if the peer device does not belong to the family of peer devices, performing a first search of local data storage for indication of a previous paring with the peer device but not for other peer devices in the family of peer devices, performing a second search of the local data storage for indication of a previous paring with the family of peer devices but not for the peer device or performing both the first search and the second search in any order.

2. The method of claim 1, wherein the custom UUID is an identifier selected from the group consisting of a Service Discover Protocol that includes the custom UUID, an Extended Inquiry Response (EIR) record that includes the custom UUID, and a Null UUID.

3. The method of claim 1, wherein determining whether the pairing has previously been made with the peer device includes searching the local data storage for an address of the peer device.

4. The method of claim 3, wherein establishing the connection with the peer device using a previously stored link key includes identifying another link key associated with the address of the peer device and using the another link key to wirelessly communicate with the peer device.

5. The method of claim 1, wherein determining whether the pairing has previously been made with any other peer device in the family of peer devices includes searching the local data storage for an identifier which uniquely identifies the family of peer devices.

6. The method of claim 5, wherein establishing the connection with the peer device using the previously stored link key includes identifying another link key associated with the identifier, creating a new link key by associating the another link key with the peer device, and using the new link key to wirelessly communicate with the peer device.

7. The method of claim 1, wherein the pairing operation is a pairing operation performed in accordance with a Bluetooth protocol.

8. A user device, comprising computer hardware and software operable to:
detect a peer device that is wirelessly broadcasting a custom Universally Unique Identifier (UUID) that advertises the peer device as belonging to a family of peer devices;
determine using the custom UUID, whether a pairing has previously been made with the peer device or any other peer device in the family of peer devices, or whether the custom UUID indicates the peer device does not belong to the family of peer devices;
if the pairing has previously been made, establish a connection with the peer device using a previously stored link key;

if the pairing has not previously been made, perform a pairing operation with the peer device to create a link key and generate a record associating the link key with the family of peer devices; and if the peer device does not belong to the family of peer devices, performing a first search of local data storage for indication of a previous paring with the peer device but not for other peer devices in the family of peer devices, performing a second search of the local data storage for indication of a previous paring with the family of peer devices but not for the peer device or performing both the first search and the second search in any order.

9. The user devices of claim 8, wherein the custom UUID is an identifier selected from the group consisting of a Service Discover Protocol that includes the custom UUID, an Extended Inquiry Response (EIR) record that includes the custom UUID, and a Null UUID.

10. The user device of claim 8, wherein whether the pairing has previously been made with the peer device includes searching the local data storage for an address of the peer device.

11. The user device of claim 10, wherein establishing the connection with the peer device using the previously stored link key includes identifying a another link key associated with the address of the peer device and use the another link key to wirelessly communicate with the peer device.

12. The user device of claim 8, wherein whether the pairing has previously been made with any other peer device in the family of peer devices includes searching the local data storage for an identifier which uniquely identifies the family of peer devices.

13. The user device of claim 12, wherein establishing the connection with the peer device using the previously stored link key includes identifying a another link key associated with the identifier, create a new link key by associating the another link key with the peer device, and use the new link key to wirelessly communicate with the peer device.

14. A method for establishing communications between a peer device and a user device, the method comprising a peer device:

wirelessly broadcasting a custom Universally Unique Identifier (UUID) that advertises the peer device as belonging to a family of peer devices;

wirelessly receiving a connection attempt from a user device;

determining, using the custom UUID, whether a pairing has previously been made with the user device by the peer device or any other peer device in the family of peer devices, or whether the custom UUID indicates the peer device does not belong to the family of peer devices;

if the pairing has previously been made, establishing a connection with the user device using a previously stored link key;

if the pairing has not previously been made, performing a pairing operation with the user device to create a link key and generating a record associating the link key with the user device; and if the peer device does not belong to the family of peer devices, performing a first search of local data storage for indication of a previous paring with the peer device but not for other peer devices in the family of peer devices, performing a second search of the local data storage for indication of a previous paring with the family of peer devices but not for the peer device or performing both the first search and the second search in any order.

15. The method of claim 14, wherein the custom UUID is an identifier selected from the group consisting of a Service Discover Protocol that includes the custom UUID, an Extended Inquiry Response (EIR) record that includes the custom UUID, and a Null UUID.

16. The method of claim 14, wherein determining whether pairing has previously been made by the peer device includes searching the local data storage for an address of the user device.

17. The method of claim 16, wherein establishing the connection with the user devices using a previously stored link key includes identifying another link key associated with the address of the user device and using the another link key to wirelessly communicate with the user device.

18. The method of claim 14, wherein determining whether the pairing has previously been made by any other peer device in the family of peer devices includes searching a remote data storage and retrieval system for an address of the user device.

19. The method of claim 18, wherein establishing the connection with the user device using the previously stored link key includes identifying another link key associated with the address of the user device, creating a new link key by associating the another link key with the peer device, and using the new link key to wirelessly communicate with the user device.

20. The method of claim 14, wherein the pairing operation is a pairing operation performed in accordance with a Bluetooth protocol.

* * * * *